United States Patent
Wang

(10) Patent No.: US 9,218,137 B2
(45) Date of Patent: Dec. 22, 2015

(54) SYSTEM AND METHOD FOR PROVIDING DATA MIGRATION SERVICES

(75) Inventor: Jinhu Wang, Irvine, CA (US)

(73) Assignee: International Business Machines Corporation, Armonk, NY (US)

(*) Notice: Subject to any disclaimer, the term of this patent is extended or adjusted under 35 U.S.C. 154(b) by 1460 days.

(21) Appl. No.: 12/043,017

(22) Filed: Mar. 5, 2008

(65) Prior Publication Data

US 2009/0228527 A1 Sep. 10, 2009

(51) Int. Cl.
*G06F 17/30* (2006.01)
*G06F 3/06* (2006.01)

(52) U.S. Cl.
CPC .............. *G06F 3/0647* (2013.01); *G06F 3/067* (2013.01); *G06F 3/0617* (2013.01)

(58) Field of Classification Search
USPC .................................. 707/803, 804, 809, 810
See application file for complete search history.

(56) References Cited

U.S. PATENT DOCUMENTS

| | | | | |
|---|---|---|---|---|
| 6,119,130 | A * | 9/2000 | Nguyen et al. | 707/695 |
| 6,151,608 | A * | 11/2000 | Abrams | 707/679 |
| 6,216,137 | B1 | 4/2001 | Nguyen et al. | |
| 7,072,913 | B2 | 7/2006 | Jans et al. | |
| 2001/0033296 | A1 | 10/2001 | Fullerton et al. | |
| 2005/0149582 | A1 | 7/2005 | Wissmann et al. | |
| 2006/0149748 | A1* | 7/2006 | Yamakawa et al. | 707/10 |
| 2007/0136353 | A1 | 6/2007 | Hsiao et al. | |
| 2007/0220089 | A1 | 9/2007 | Aegerter | |
| 2007/0299975 | A1* | 12/2007 | Daschakowsky et al. | 709/228 |

FOREIGN PATENT DOCUMENTS

WO 9952044 10/1999

OTHER PUBLICATIONS

Uwe Hohenstein "Supporting Data Migration between Relational and Object-Oriented Databases Using a Federation Approach", International Symposium on Database Engineering and Applications, Sep. 2000, pp. 371-379.

David J. Russomanno "A knowledge-based framework for intelligent data migration", Expert Systems, May 1996, vol. 13, No. 2, pp. 121-132.

Dirk Draheim et al. "The Schema Evolution and Data Migration Framework of the Environmental Mass Database IMIS", 16th International Conference on Scientific and Statistical Database Management, Jun. 2004, pp. 341-344.

(Continued)

*Primary Examiner* — Mariela Reyes
(74) *Attorney, Agent, or Firm* — Patterson & Sheridan, LLP

(57) ABSTRACT

Embodiments of the invention provide techniques for migrating data which allows transforming a data source of an existing system into a migrated data source complying with data requirements of a new system, typically in response to an upgrade of an application configured to access the data source. The system and method for data migration services is reusable (i.e., it may be used for different levels of data migration, e.g., in system upgrades to different versions), idempotent (i.e., it may be used multiple times on the same level of data migration, e.g., it may be applied multiple time in the same system upgrade of the same data without causing any disruption or different result when applied multiple times), and metadata driven (i.e., it does not require significant changes to be used for data migration of different systems).

21 Claims, 3 Drawing Sheets

(56) References Cited

OTHER PUBLICATIONS

Ole G. Jensen et al. "Lossless Conditional Schema Evolution", 23rd International Conference on Conceptual Modeling, Lecture Notes in Computer Science, Nov. 2004, vol. 3288, pp. 610-623.

Christine L. Borgman "Multi-Media, Multi-Cultural, and Multi-Lingual Digital Libraries", Or How Do We Exchange Data in 400 Languages?, D-Lib Magazine, Jun. 1997.

Jennifer Perez et al. "ADML: A Language for Automatic Generation of Migration Plans", EurAsia-ICT 2002: Information and Communication Technology, Lecture Notes in Computer Science, Oct. 2002.

* cited by examiner

SYSTEM AND METHOD FOR PROVIDING DATA MIGRATION SERVICES

BACKGROUND OF THE INVENTION

1. Field of the Invention

The present invention generally relates to migrating data within a data repository, and more particularly to a system and method for providing data migration services.

2. Description of the Related Art

Data migration generally refers to a process of translating data from one format or storage schema to another and/or from one storage device to another. Data migration is frequently necessary when a software application or database management system is upgraded from one version to another (data stored in a current version is often called legacy data) or from one system to an entirely different system.

Usually, a new version of a software application or database management system is not fully compatible with a currently used version of the system. In other words, data formats used by the current version of the system may not comply with the configuration of the upgraded or new system. For example, a new version of a software application system may incorporate different changes, such as a new or modified database schema, new architecture, new storage methods, and so on.

One commonly used method for migrating data is to develop a set of customized programs or scripts that transfer the data. To achieve an effective data migration procedure, an existing and new system's structures are analyzed and defined. The existing system's data are mapped to the new system's data providing a design for the data extraction and data loading. Such a design relates existing data in the database management system to the new system data formats and requirements. Analyses are performed on the existing system as well as on the new system to understand how the systems work, who uses them, what they are used for, how the data in the systems are stored (e.g., files, flat files, tables, etc.) and the like. Such analyses typically involve studying existing documentation (e.g., documentation produced once the application was completed, an original specification, and the like). As system documentation is often incomplete or missing, system developers may have to be contacted to collect necessary information. However, it is common for developers to be spread out to several geographical different locations, or even not be available. Thus, an existing code of the systems may have to be reviewed and documented as well.

Additionally, to prevent data loss if a data migration process fails during its execution (e.g., power failure), the existing system's data must be backed up. Typically, if the data migration process fails or is otherwise interrupted, the process has to be re-started with loss of all data transformation already made before the failure or interruption. Also, failure of the data migration process may corrupt some elements of data in the existing database. Accordingly, data migration frequently becomes a disruptive and time-consuming process.

SUMMARY OF THE INVENTION

One embodiment of the invention includes a method for migrating a version of a data source from an initial version to a target version required by a target system. The method may generally include retrieving a set of target metadata and a plurality of migration rules. For each of the plurality of migration rules, a data unit of the initial version of the data source subject to a respective migration rule is identified. Additionally, based on the respective migration rule, the target metadata and the identified data unit are analyzed to determine at least one difference between the identified data unit and the target metadata. The target metadata describes a structure of the data source required by the target version of the data source, relative to the respective migration rule. The data unit may be transformed using the determined at least one difference, where the transformed data unit conforms to the structure of the data source required by the target system, as specified by the target metadata.

Another embodiment of the invention includes a computer-readable storage medium containing a program which, when executed, performs an operation for migrating a version of a data source from an initial version to a target version required by a target system. The operation may generally include retrieving a set of target metadata and a plurality of migration rules. For each of the plurality of migration rules, a data unit of the initial version of the data source subject to a respective migration rule is identified. Additionally, based on the respective migration rule, the target metadata and the identified data unit are analyzed to determine at least one difference between the identified data unit and the target metadata. The target metadata describes a structure of the data source required by the target version of the data source, relative to the respective migration rule. The data unit may be transformed using the determined at least one difference, where the transformed data unit conforms to the structure of the data source required by the target system, as specified by the target metadata.

Still another embodiment of the invention includes a system for providing a data migration service. The system may generally include a data source, target metadata describing data requirements of a target system, and a universal data migration module (UDMM) in communication with the data source and the target metadata. The UDMM may generally be configured to perform an operation for migrating a version of a data source from an initial version to a target version required by a target system. In particular, the UDMM may be configured to retrieve a set of target metadata and a plurality of migration rules. For each of the plurality of migration rules, the UDMM may be configured to identify a data unit of the initial version of the data source subject to a respective migration rule and analyze, based on the respective migration rule, the target metadata and the identified data unit to determine at least one difference between the identified data unit and the target metadata. The target metadata describes a structure of the data source required by the target version of the data source, relative to the respective migration rule. The UDMM may be further configured to transform the data unit using the determined at least one difference, where the transformed data unit conforms to the structure of the data source required by the target system, as specified by the target metadata.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments illustrated in the appended drawings.

It is to be noted, however, that the appended drawings illustrate only typical embodiments of this invention and are therefore not to be considered limiting of its scope, because the invention may admit to other equally effective embodiments.

DETAILED DESCRIPTION OF THE PREFERRED EMBODIMENTS

Figure 1:
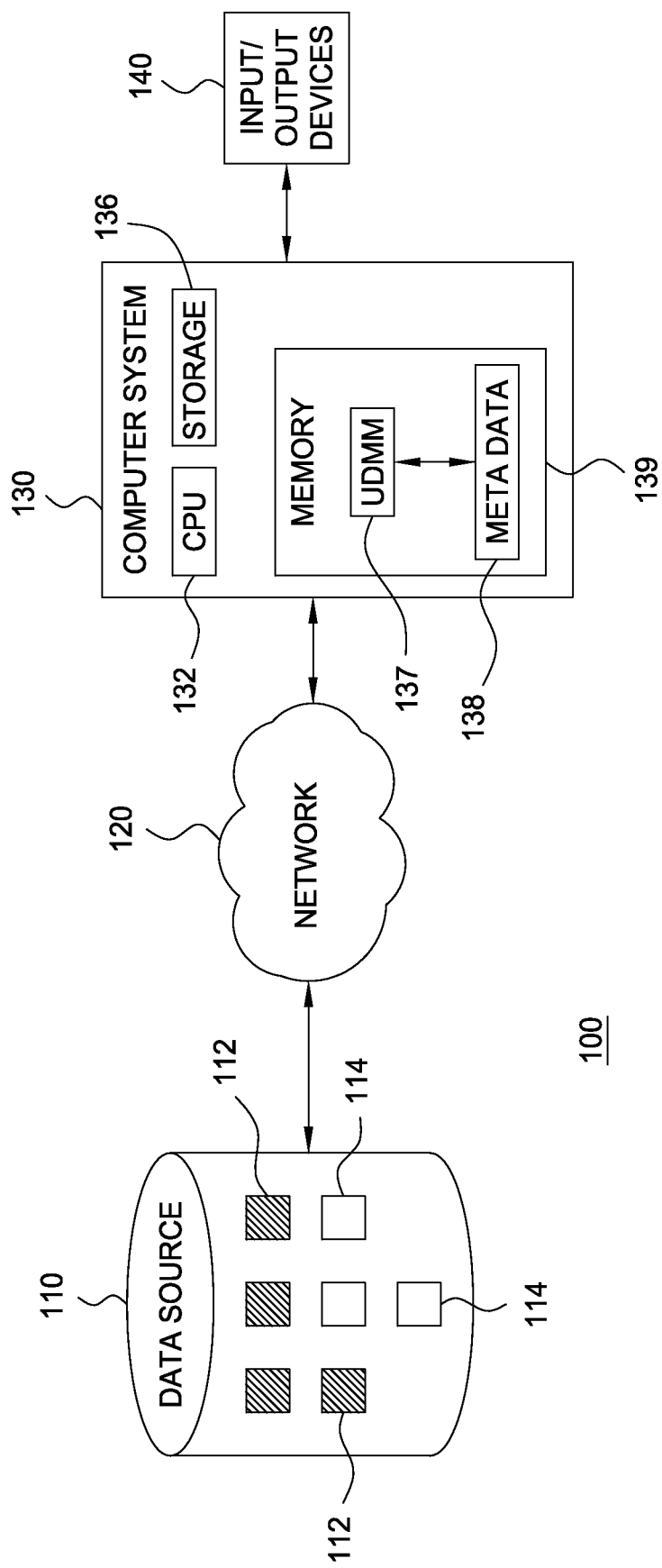
FIG. 1 is a block diagram illustrating a system for providing data migration services, according to one embodiment of the present invention.

Embodiments of the invention allow data contained in one or more data sources to be migrated or upgraded by providing a method for migrating data which allows transforming data of an existing system into data complying with data requirements of a new system (target system). In context of the present invention, the data of an existing system is contained in a data source, typically a relational database. After the data migration process is complete, data from the data source is transformed to satisfy a structure, schema, or other requirements of the target system. Further, embodiments of the invention provide a system and method for data migration services that is reusable (i.e., it may be used for different levels of data migration, e.g., in system upgrades to different versions), idempotent (i.e., it may be used multiple times on the same level of data migration, e.g., it may be applied multiple time in the same system upgrade of the same data without causing any disruption or different result when applied multiple times), and metadata driven (i.e., it does not require significant changes to be used for data migration of different systems).

In the following, reference is made to embodiments of the invention. However, it should be understood that the invention is not limited to any specifically described embodiment. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to and from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention may be part of an operating system or a specific application, component, program, module, object, or sequence of instructions. The computer program of the present invention is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

As stated, embodiments of the present invention provide a method for migrating data and a system for providing data migration services. FIG. 1 is a block diagram illustrating a system 100 for providing data migration services, according to one embodiment of the present invention. As shown, the system 100 includes a data source 1 10 a network 120, a computer system 130, and input and output/devices 140. The data source 110 may store data of different formats and structures, which include but are not limited to files (e.g., computer files, image files, electronic documents, web content, and the like), flat files (e.g., table encoded as a plain text file), ISAM, heaps, hash buckets, B+ trees, tables, and the like. Data from data source 110 may be accessed by a variety of software applications. Examples of a software application include database management systems, content management systems (e.g., enterprise content management systems, web content management systems, etc.), file systems, database query applications, and the like.

For example, data source 110 may be a relational database and a software application may be configured to establish a connection with the data source 110, submit a query (or other database operation), and receive a set of results for further processing. Typically such an application submits queries assuming that data is stored in data source 110 according to a schema defining how data is organized within the data source 110. The schema may specify a collection of columns and tables as well as specify relationships between tables. However, when a new version of the application is developed (e.g., to provide new features) the new version may reference elements of the schema not present in data source 110 or reference existing elements modified in some way. Thus, in such a scenario, the data source 110 needs to be migrated from the then existing version to a version that functions correctly with the new version of the software application.

Accordingly, in one embodiment, the computer system 130 may include a universal data migration module 137 configured to, via the network 120, access and process data units 114 of the data source 110 in order to transform the data units 114 into migrated data units 112. In this example, data represented by the migrated data units 112 conforms with standards and requirements of a target system, i.e., each migrated data unit 112 represents a portion of the data source 110 upgraded for use with a new version of a software application configured to access data within data source 110. After a data migration process on data stored within data source 110 is complete, the target system may store, use, and/or process data stored within the data source 110.

The network 120 may be used by the data source 110 and the computer system 130. Network 120 allows the computer system 130 to communicate with data source 110 in order to access and transform the data units 114 of the data source 110 into the migrated data units 112. Illustratively, the computer system 130 includes a CPU 132, a storage 136 (e.g., a disk drive, optical disk drive, floppy disk drive, and the like), and a memory 139 containing the universal data migration module (UDMM) 137 and a collection of target metadata 138.

The system 100 illustrated in FIG. 1 may include existing computer systems, e.g., desktop computers, server computers, laptop computers, tablet computers, and the like. The system 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

Central processing unit (CPU) 132 may be configured to obtain instructions and data from storage 136 and memory 139. Generally, CPU 132 is a programmable logic device that performs all the instruction, logic, and mathematical processing in a computer. Storage 136 stores application programs and data for use by client computer 130. Storage 136 may include hard-disk drives, flash memory devices, optical media and the like. Computer system 130 is connected to the network 120, which generally represents any kind of data communications network. Accordingly, the network 120 may represent both local and wide area networks, including the Internet. Memory 139 may include an operating system (OS) for managing the operation of the client computer 130. Examples of an OS include UNIX, a version of the Microsoft Windows® operating system, and distributions of the Linux® operating system. (Note, Linux is a trademark of Linus Torvalds in the United States and other countries.)

The UDMM 137 provides the functionality of the system 100 for providing data migration services. In one embodiment, the UDMM 137 provides a software application configured to migrate data in the data source 110 and/or a structure or schema of the data source 110. The UDMM 137 may be configured to use a set of pre-defined rules and the metadata 138 to transform the data units 114 into the migrated data units 112. The predefined rules, the metadata 138, the data units 114 and the migrated data units 112 are discussed in greater detail below.

In one embodiment, metadata 138 describes data regarding a data schema or structure associated with the target system. That is, the metadata 138 describes a schema or structure expected by an upgraded software application configured to access data from data source 110. For example, the metadata 138 may be used by the target system to facilitate the understanding, use, and/or management of its data. Elements of the metadata 138 may describe individual data elements of the data source 110, a content item, or a collection of data including multiple content items. What elements of metadata 138 describe may depend, for example, on the type of the target system, type and/or form of data used by the target system, context the data is used in, and so on. For example, in the context of the information system, where the data source 110 includes content of computer files, elements of metadata 138 may include the name of a field and its length. Metadata about a collection of data items, such as a computer file, may include the name of the file and the type of the file. Another example includes relational database system, where metadata 138 may include table names and sizes; numbers of rows and/or columns in each table; tables of columns in each database, what tables the columns are used in, the type of data stored in each column, and the like.

The input/output devices 150 may include a monitor, a keyboard, a mouse, a printer, a modem, combination thereof, and the like. In one embodiment, the input/output devices 140 are used to monitor, control, and/or adjust the operation of the UDMM 137, for example, by specifying which data source and/or which target metadata should be used in the migration process.

Note, however, FIG. 1 illustrates merely one possible arrangement of the system 100 for providing data migration services. For example, while the data source 110 is shown connected to the computer system 130 via the network 120, the network 120 is not always present or needed (e.g., the data source 110 may be present as part of the computer system 130). Furthermore, UDMM 137 and/or computer system 130 may be implemented as a part of the target system that would directly communicate with the data source 110. In one embodiment, the system 100 for providing data migration services may include more than one data source 110 and/or computer system 130. In another embodiment, the computer system 130 may include more than one set of target metadata 138.

Figure 2:
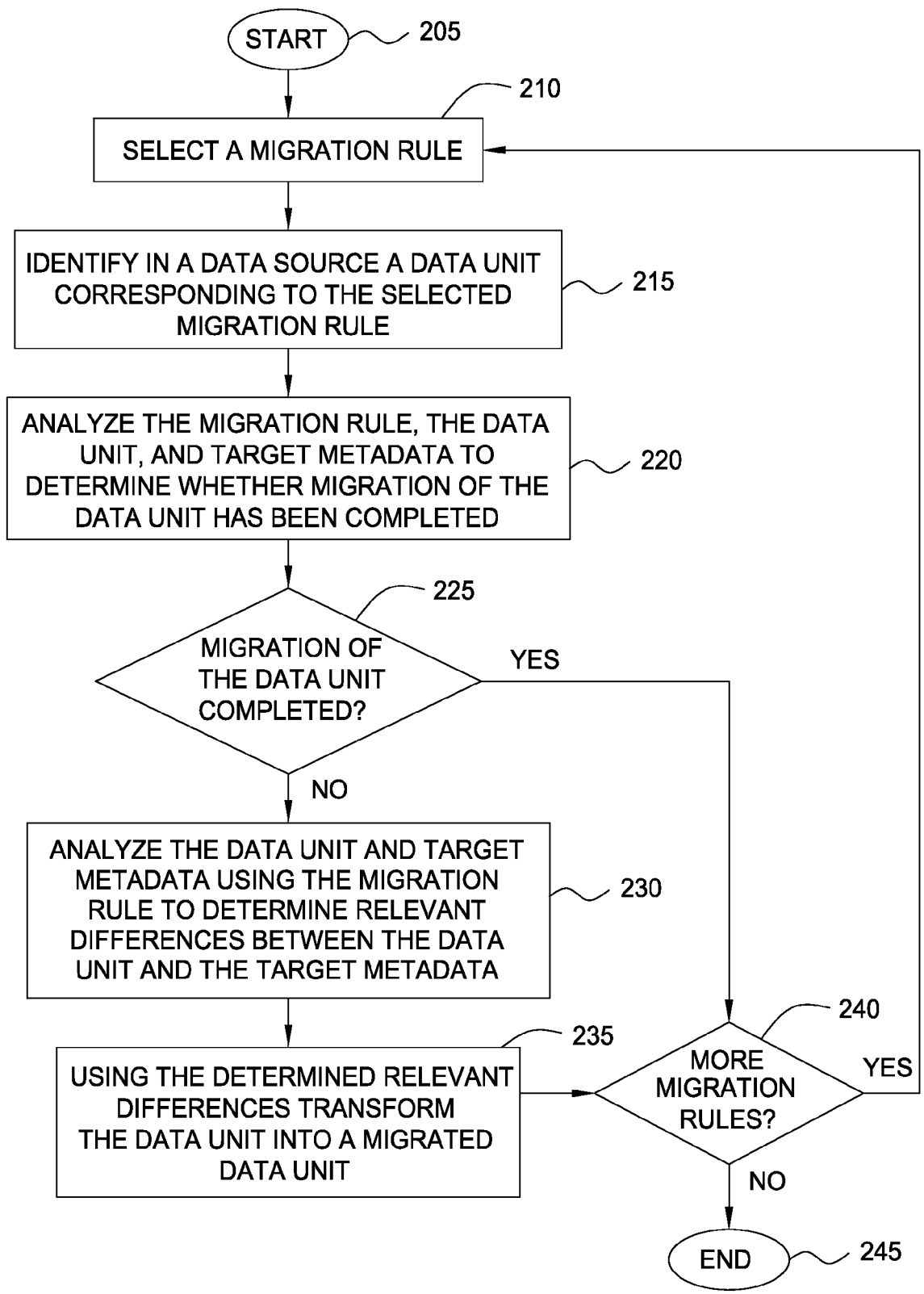
FIG. 2 illustrates a flowchart of a method for migrating data, according to one embodiment of the present invention.

FIG. 2 illustrates a method 200 for migrating data, according to one embodiment of the present invention. As shown, the method begins at step 205. At step 210, a migration rule is selected. In one embodiment, the migration rule is selected from a set of pre-defined migration rules. Additionally, the set of the pre-defined migration rules may be included as part of the UDMM 137. Which rules and how many rules are included in the set of the pre-defined rules vary between different embodiments of the present invention. Generally, the pre-defined rules do not depend on a particular version of the data source 110 and/or the target system. However, the pre-defined rules may depend on the type of the target system or format of data in the data source 110. For example, in one embodiment the set of the pre-defined rules could include a rule like the following: "create all new tables of the target schema that are not in the present version data source." In such a scenario, the target schema is defined by the target metadata 138. One skilled in the art would recognize that such rule is not needed unless the target system defines a data schema that includes tables for storing data.

Generally, the pre-defined rules reflect possible changes that should be applied to the data source 110 in order for the data source 110 to conform with the requirements/standards of the target system, i.e., to conform with an upgraded version of a software application. Such changes may relate to data formats, data structures, data sizes, data schemas and so on. The changes may involve adding new elements and/or structures absent in the data source 110 and/or updating existing pieces and/or data structures already present in the data source 110. Consider an example where the target system is an enterprise content management system backed by a relational database. In such a scenario, one change that may be needed to the data source 110 may be to add new tables; accordingly, one of the pre-defined rules could specify the following: "create all new tables of the target schema that are not present in the data source." Similarly, another rule could specify to create new columns for existing tables. Such a rule could be defined like the following: "create columns for tables in the target schema that are not present in the data source." Still another example includes adding new rows referencing classes to a class definition table like the following: "create all new class definitions of the target schema that are not present in the data source;" or adding property definitions to existing property definitions tables, e.g., "create all new property definitions of the target schema that are not present in the data source." Other rules could update existing columns in the data source 110 by changing column default values, increasing allowed size of column values, e.g., "update all columns of the data source that have a different format from a format specified in the target schema," or more specifically, "update all columns of the data source which allow store values of a smaller size than corresponding columns of the target schema." It is contemplated, however, that the rules specified by the UDMM may be tailored to suit the needs of a particular case, the type of data source 110 and type of data structure or schema expected in the target system.

Migration rules may be selected to be executed in a variety of ways, e.g., according to a pre-defined algorithm. For example, in one embodiment the rules affecting table changes are applied before the rules affecting column or row changes. Again however, one of ordinary skill in the art will appreciate that the examples above are merely examples and that other migration rules may be used in accordance with the principles of the present invention. Further, if needed, multiple sets of pre-defined rules may be defined as a part of the system for providing data migration services. In such a case, the particular migration rules to use may be determined, e.g., based on a type of the target system.

At step 215, once a migration rule is selected to be applied to the data source 110, a data unit corresponding to the selected migration rule is identified within the data source 110. Generally, a data unit is a set that includes elements of the data source 110 (e.g., tables, columns, rows, files, and etc.) that may possibly need to be modified according to the selected migration rule in order to bring for the data source 110 to conform with the target system requirements/standards (as specified by the metadata describing the target system). For example, if the selected migration rule specifies to "create all new tables of the target schema that are not present in the data source," then the corresponding data unit would include all tables of the data source 110, because all tables of the data source 110 should be checked to determine whether a certain table of the target schema is present or should be added to the data source 110. Another example, if the selected migration rule specifies to "create all new class definitions of the target schema that are not present in the data source," then the corresponding data unit would include a Class Definition table, because the Class Definition table is where new class definitions, if any, should be added.

Combination of all data units 114 does not necessarily represent data of the data source 110, meaning that such combination might not include all elements of the data source 110 or include repeated pieces of data. As some data elements of the data source may require several different changes to conform to the requirements/standards of the target system.

Similarly, two or more units of data 114 may include the same elements. Thus, in the example described above, the Class Definition table is included in both data units, i.e., the data unit corresponding to the update table rule and the data unit corresponding to the update class definitions rule.

At step 220, the selected migration rule, the corresponding data unit 114, and the target metadata 138 are analyzed to determine whether the migration of the data unit 114 has been completed. In one embodiment, the data unit 114 and the target metadata 138 are scanned until a first inconsistency associated with the selected migration rule between the two is recognized. For example, if the rule is "create all new columns of the target schema that are not present in the data source" then as soon as it is recognized that one column of the target schema is absent from the data unit 114, it is determined that the migration of the data unit 114 has not been completed and the method 200 proceeds to step 230 via step 225. However, if it is determined that the data migration of the data unit 114 has been completed, the method 200 proceeds to step 240 via step 225.

At step 230 the data unit 114 and the target metadata 138 are analyzed in light of the selected migration rule to determine all relevant differences between the data unit 114 and the target schema. For example, if the rule is "create all new tables of the target schema that are not present in the data source," tables of the target schema absent in the data unit 114 are relevant, and thus, are going to be determined as relevant differences. In contrast, if a table described in the target schema has, for example, more columns then corresponding already existing table of the data unit 114, such difference is not relevant to the above recited migration rule, and thus is not recognized at step 230.

Once the relevant differences are determined, then at step 235 the determined differences are used to transform the data unit 114. In the example above, transforming of the data unit 114 would involve creating the identified tables of the target schema missing from the data unit 114. After such tables are created, the data unit 114 is fully transformed into the migrated data unit 112, and the method proceeds to step 240. It should be noted that data of the migrated data unit 112 may comply with the data requirements of the target system only as applied to the corresponding migration rule. In the example above, where the migration rule involves adding new tables, a data requirement of having certain tables in a data source would be satisfied by the data of the migrated unit 112. However, one of the tables (which is an element of data of the migrated data unit 112) may miss a column described in the target schema, thus the data of the migrated unit 112 would not comply with all data requirements of the target system, but only with the requirements relevant to the corresponding migration rule.

It should be further noted, that though in the above-described embodiment the data unit 114 is transformed only after all relevant differences between the data unit 114 and the target schema have been determined, other arrangements are possible. In one embodiment, the data unit 114 may be transformed every time a new relevant difference has been determined. In another embodiment, the data unit 114 may be transformed every time a group of relevant differences have been determined.

In the embodiment illustrated in FIG. 2, performing step 240 allows the UDMM to determine whether the data migration process on the data source 110 has been completed. Specifically, once all migration rules included in the set of the pre-defined migration rules have been fully applied to the data units 114 of the data source 110, the data migration process is complete. In other words, if no migration rules are left to apply, all data units 114 of the data source 110 have been transformed into the migrated data units 112 and the data of the data source 110 is now in compliance with the requirements/standards of the target system. However, if at least one migration rule included in the set of the pre-defined migration rules has not been applied yet, the method 200 returns to step 210, where a new migration rule is selected among the not yet applied pre-defined migration rules left in the set.

Whether each migration has been applied to data source 110 may be determined and/or monitored in various ways. For example, in one embodiment, the migration rules are counted as they used. Therefore, if the set of the pre-defined rules includes M migration rules, then when the migration rule number M has been used there are no more rules left to apply. In another embodiment, the rules are applied in order, and thus after last migration rule has been used, the data migration process has been completed. Further, the information regarding which rules have been applied may be stored, for example in memory 139, until the data migration process successfully completes (even if the process has been interrupted) or, alternatively, only for duration of an uninterrupted session of the data migration process (e.g., power failure interrupting the data migration process would end the session). The method 200 concludes with step 245.

It should be noted that it is not necessary to perform all of the above-described steps in the order named. Furthermore, not all of the described steps are necessary for the described method to operate. Which steps should be used, in what order the steps should be performed, and whether some steps should be repeated/omitted more often than other steps is determined, based on, for example, needs of a particular user, specific characteristics of the data source 110 and/or the target system, and so on. For example, in one embodiment, the steps 220 and 225 are omitted. Instead, if no differences between the data unit and the target metadata were determined at step 230, the method 200 advances to step 240.

Figure 3:
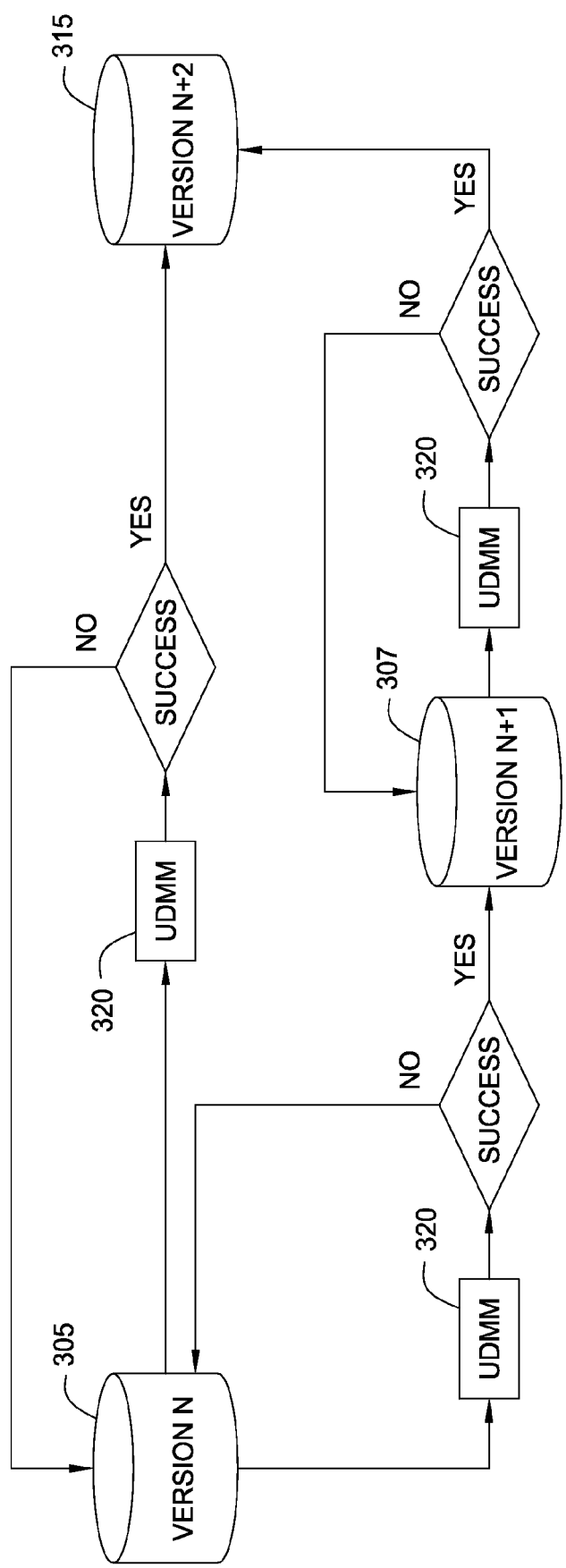
FIG. 3 illustrates examples of data migration and iterative data migration processes, according to one embodiment of the present invention.

FIG. 3 illustrates examples of data migration and iterative data migration processes, according to one embodiment of the present invention. Specifically, FIG. 3 illustrates two alternative techniques involving using the same UDMM 320 to transform version N of data source 305 into an N+2 version of data source 315. The first scenario involves using UDMM 320 (or the computer system 130 containing the UDMM 320) and target metadata describing the N+2 version of data source 315 to transform the version N of data source 305 directly. The data migration process is performed according to the above-described principles until the version N of data source 305 has been fully migrated into the version N+2 of data source 315 (indicated in FIG. 2 by a corresponding success loop).

The second technique involves incremental data migrations, first, transforming the version N of data source 305 into a version N+1 of data source 307, and then, transforming the version N+1 of data source 307 into the version N+2 of data source 315. These two data migration processes are also performed according to the above-described principles. First, the data migration process is performed on the version N of data source 305 using the UDMM 320 and target metadata describing the version N+1 of data source 307 until the version N of data source 305 has been fully migrated into the version N+1 of data source 307 (indicated in FIG. 2 by the corresponding success loop). Second, the data migration process is performed on the version N+1 of data source 307 using the same UDMM 320 and target metadata describing the version N+2 of data source 315 until the version N+1 data source 307 has been fully (successfully) migrated into the version N+2 of data source 315 (indicated in FIG. 2 by the corresponding success loop).

It should be noted that while the version N of data source 305, the version N+1 of data source 307 and the version N+2 of data source 315 are illustrated as separate elements, data is transformed by changing, not by moving. In other words, the version N data becomes the version N+1 of data source 307 and then (or directly) becomes the N+2 version of data source 315, without original data being moved or copied. However, in one embodiment, the data migration process keeps the original data intact by creating new data has based on original data and target metadata using the above-described principles. For example, before applying the method for migrating data, the original data may be copied so the method for migrating data applied to the copy of the original data.

As shown in FIG. 3, the same UDMM 320 may be used to migrate data whether from version N to version N+2, or from version N to version N+1, or from version N+1 to version N+2, where data formats and structures may differ for each version. No changes within the UDMM or the UDMM's underlying code are needed because the UDMM relies on metadata of a new system to determine what changes if any are needed within the existing system. Furthermore, if the data migration process were to fail (e.g., because of power failure) or stopped without completion for any reason, no data would be corrupted and the data migration process may continue from the point where it stopped. In other words, data transformations that have been made before the failure do not need to be redone.

Advantageously, embodiments of the invention allow data contained in one or more data sources to be migrated or upgraded by providing a method for migrating data which allows transforming data of an existing system into data complying with data requirements of a new system (target system). Further, embodiments of the invention described herein provide a system and method for data migration services that is reusable (i.e., it may be used for different levels of data migration, e.g., in system upgrades to different versions), idempotent (i.e., it may be used multiple times on the same level of data migration, e.g., it may be applied multiple time in the same system upgrade of the same data without causing any disruption or different result when applied multiple times), and metadata driven (i.e., it does not require significant changes to be used for data migration of different systems).

While the foregoing is directed to embodiments of the present invention, other and further embodiments of the invention may be devised without departing from the basic scope thereof, and the scope thereof is determined by the claims that follow.

What is claimed is:

1. A method for migrating a version of a data source from an initial version to a target version required by a target system, the method comprising:

retrieving a set of target metadata, wherein the data source comprises a relational database configured according to a source schema, and wherein the target metadata specifies a target schema of the relational database required by the target system;

retrieving a plurality of migration rules applied to migrate the source schema from the source schema to the target schema;

determining an ordered priority for applying the plurality of migration rules; and applying the plurality of migration rules according to the determined priority, wherein applying the plurality of migration rules comprises:
for each of the plurality of migration rules:
identifying at least one element of the initial version of the data source configured according to the source schema and subject to a respective migration rule,
analyzing, based on the respective migration rule, the target metadata and the identified source schema element to determine at least one difference between the identified source schema element and the target schema as specified by the target metadata, wherein the target metadata describes a structure of the data source required by the target schema, relative to the respective migration rule, and
transforming the source schema element using the determined at least one difference, wherein the transformed source schema element conforms to the structure of the target schema, as specified by the target metadata.

2. The method of claim 1, wherein the data source comprises a file system, and wherein the target metadata specifies a structure of the file system required by the target system.

3. The method of claim 1, wherein at least one migration rule specifies to create all new tables of the target database schema not present in the initial version of the data source configured according to the source schema.

4. The method of claim 1, wherein at least one migration rules specifies to add one or more columns to a table present in the initial version of the data source.

5. The method of claim 1, wherein at least one migration rule specifies to add one or more class definitions to the initial version of the data source.

6. The method of claim 1, wherein at least one migration rule specifies to add one or more rows to an existing table in the initial version of the data source.

7. The method of claim 1, wherein the target system is a system selected from one of a database management system, a filing system, and a content management system.

8. A computer-readable storage medium containing a program which, when executed, performs an operation for migrating a version of a data source from an initial version to a target version required by a target system, the operation comprising:
retrieving a set of target metadata, wherein the data source comprises a relational database configured according to a source schema, and wherein the target metadata specifies a target schema of the relational database required by the target system;
retrieving a plurality of migration rules applied to migrate the source schema from the source schema to the target schema;
determining an ordered priority for applying the plurality of migration rules; and applying the plurality of migration rules according to the determined priority, wherein applying the plurality of migration rules comprises; and
for each of the plurality of migration rules:
identifying at least one element of the initial version of the data source configured according to the source schema and subject to a respective migration rule,
analyzing, based on the respective migration rule, the target metadata and the identified source schema element to determine at least one difference between the identified source schema element and the target schema as specified by the target metadata, wherein the target metadata describes a structure of the data source required by the target schema, relative to the respective migration rule, and
transforming the source schema element using the determined at least one difference, wherein the transformed source schema element conforms to the structure of the target schema, as specified by the target metadata.

9. The computer-readable storage medium of claim 8, wherein the data source comprises a file system, and wherein the target metadata specifies a structure of the file system required by the target system.

10. The computer-readable storage medium of claim 8, wherein at least one migration rule specifies to create all new tables of the target database schema not present in the initial version of the data source configured according to the source schema.

11. The computer-readable storage medium of claim 8, wherein at least one migration rules specifies to add one or more columns to a table present in the initial version of the data source.

12. The computer-readable storage medium of claim 8, wherein at least one migration rule specifies to add one or more class definitions to the initial version of the data source.

13. The computer-readable storage medium of claim 8, wherein at least one migration rule specifies to add one or more rows to an existing table in the initial version of the data source.

14. The computer-readable storage medium of claim 8, wherein the target system is a system selected from one of a database management system, a filing system, and a content management system.

15. A system for providing a data migration service, the system comprising:
a processor;
a data source;
target metadata describing data requirements of a target computing system; and
a memory storing a universal data migration module (UDMM) application in communication with the data source and the target metadata, wherein the UDMM, when executed by the processor, performs an operation for migrating a version of a data source from an initial version to a target version required by a target system by performing the steps of:
retrieving a set of target metadata, wherein the data source comprises a relational database configured according to a source schema, and wherein the target metadata specifies a target schema of the relational database required by the target system;
retrieving a plurality of migration rules applied to migrate the source schema from the source schema to the target schema;
determining an ordered priority for applying the plurality of migration rules; and applying the plurality of migration rules according to the determined priority,
wherein applying the plurality of migration rules comprises:
for each of the plurality of migration rules:
identifying at least one element of the initial version of the data source configured according to the source schema and subject to a respective migration rule,
analyzing, based on the respective migration rule, the target metadata and the identified source schema element to determine at least one difference between the identified source schema element and the target schema as specified by the target metadata, wherein the target metadata describes a structure of the data source required by the target schema, relative to the respective migration rule, and transforming the source schema element using the determined at least one difference, wherein the transformed source schema element conforms to the structure of the target schema, as specified by the target metadata.

16. The system of claim 15, wherein the data source comprises a file system, and wherein the target metadata specifies a structure of the file system required by the target system.

17. The system of claim 15, wherein at least one migration rule specifies to create all new tables of the target database schema not present in the initial version of the data source configured according to the source schema.

18. The system of claim 15, wherein at least one migration rules specifies to add one or more columns to a table present in the initial version of the data source.

19. The system of claim 15, wherein at least one migration rule specifies to add one or more class definitions to the initial version of the data source.

20. The system of claim 15, wherein at least one migration rule specifies to add one or more rows to an existing table in the initial version of the data source.

21. The system of claim 15, wherein the target system is a system selected from one of a database management system, a filing system, and a content management system.

* * * * *